July 18, 1961 R. F. KARLICEK 2,993,172
VOLTAGE UNBALANCE DETECTOR APPARATUS
Filed Jan. 15, 1959
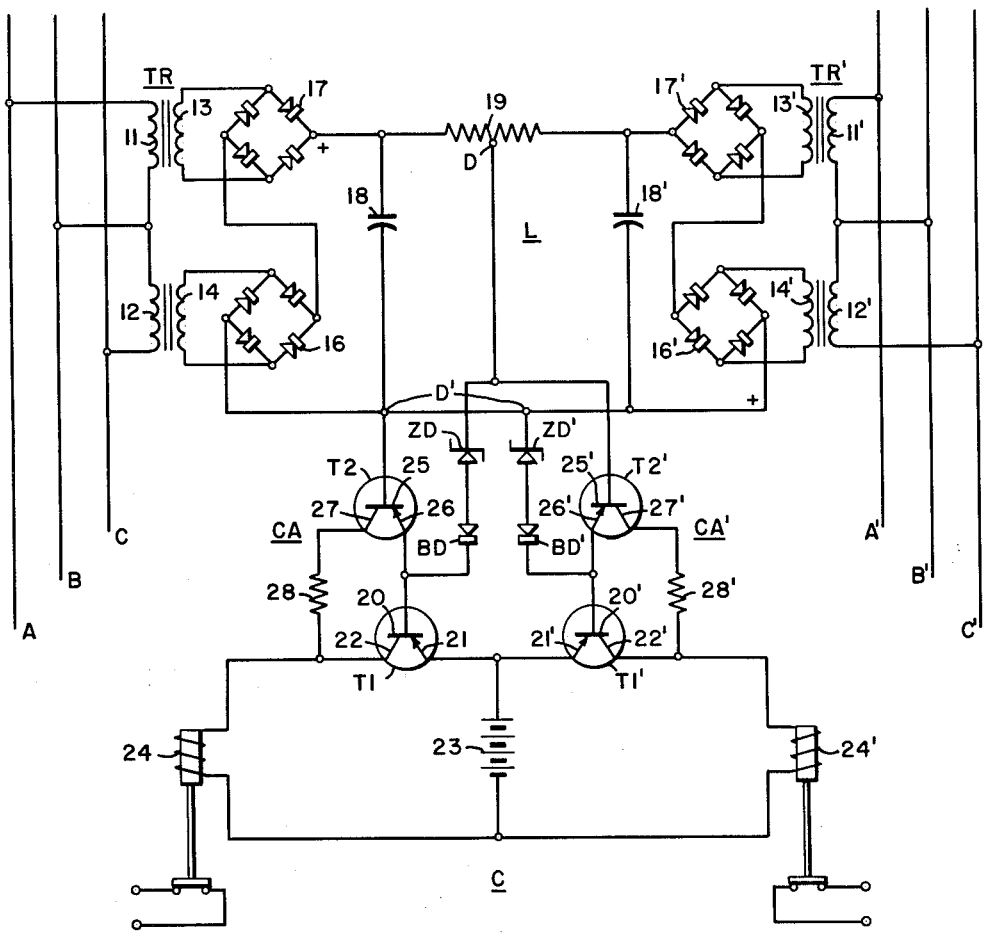
WITNESSES
INVENTOR
Robert F. Karlicek
BY
ATTORNEY United States Patent Office 2,993,172
Patented July 18, 1961

1

2,993,172
VOLTAGE UNBALANCE DETECTOR APPARATUS
Robert F. Karlicek, Lombard, Ill., assignor to Westinghouse Electric Corporation, East Pittsburgh, Pa., a corporation of Pennsylvania
Filed Jan. 15, 1959, Ser. No. 787,010
2 Claims. (Cl. 324—133)

This invention, in general, relates to voltage unbalance detectors, and in particular, to a voltage unbalance detector for indicating the direction of voltage unbalance.

The object of this invention, generally stated, is to provide a voltage unbalance detector comprised of static elements for indicating rapidly and reliably the direction of voltage unbalance.

More specifically, an object of this invention is to provide static elements providing different output signals in accordance with the polarity of a voltage differential between two sources.

Other objects and features of this invention will become apparent upon consideration of the following description thereof, taken in conjunction with the accompanying drawings; wherein the single drawing figure is a schematic diagram of one embodiment of the invention.

According to one embodiment of this invention, the line-to-line voltages of two normally balanced three-phase voltage sources are full-wave rectified and connected in series additive relationship to form a loop carrying a small circulating current. A control circuit is connected across the loop so that the rectified voltages of the two sources are connected in opposed parallel relationship to each other with respect to the control circuit, thus providing a zero voltage input to the control circuit when the two sources are in a balanced condition. The occurrence of an unbalanced voltage condition between the two sources produces a voltage differential across the loop, which voltage differential assumes one or the other of two polarities, depending upon which source has deviated from the normal in a diminished voltage direction. In the control circuit, a first Zener diode and blocking diode are adapted to respond to a voltage differential having a predetermined one of the two polarities to energize a first transistor switching circuit for connecting a signal source through a transistor amplifier to energize a first control relay, while a second Zener diode and blocking diode are adapted to respond only to a voltage differential having the other of the two polarities to energize a second transistor switching circuit for connecting the same signal source through a transistor amplifier to energize a second control relay. The device is thus capable not only of detecting a voltage differential between two sources, but develops an appropriate output signal which indicates which of the voltage sources has the lower voltage.

Referring now to the drawing figure, there is provided a potential transformer and rectifier unit TR having primary winding 11 connected to energize secondary winding 13 in response to line-to-line voltage A—B, and having primary winding 12 connected to energize secondary winding 14 in response to line-to-line voltage B—C. A pair of bridge rectifiers 16 and 17 are connected in series additive relationship with respect to each other and are connected to be individually energized by secondaries 14 and 13, respectively, so as to provide a full-wave rectified output from potential transformer-rectifier unit TR. Capacitor 18 is connected across the bridges 16 and 17 to perform a filtering function in a well-known manner. A second potential transformer unit TR' is identical in structure and operation to the previously described potential transformer unit TR and accordingly the corresponding elements have been given the same reference numerals, with the addition of the suffix (') to identify the elements of transformer unit TR'. The potential transformer TR' is responsive to line-to-line voltages A'—B' and B'—C'.

The bridge rectifiers 16, 17, 16' and 17' are all connected in circuit to provide series additive polarity through a current limiting resistor 19 so that a small current may flow around the loop L so formed. A control circuit C, to be hereinafter described in detail, is connected to the loop circuit at point D and D' so as to be responsive to a differential in output voltage between transformer rectifier units TR and TR'. It is readily seen that when the line-to-line voltages supplying transformer-rectifier unit TR are equal to the line-to-line voltages supplying transformer-rectifier unit TR', no voltage differential exists between points D and D'. It is also readily seen that an open condition in any phase, such as may be caused by the operation of a fuse, will produce a relatively low voltage condition in the corresponding transformer-rectifier unit to thus provide a voltage differential between points D and D'. If the open condition occurs in any one of phases A, B or C, the voltage output from transformer-rectifier unit TR is less than that from transformer TR', thus providing point D' with a positive potential relative to point D. Conversely, if the open condition occurs in any of phases A', B', or C', the voltage output from transformer rectifier unit TR' is less than that from transformer-rectifier unit TR, thus providing point D with a positive potential relative to point D'.

The control circuit C is comprised of two transistor circuits CA and CA', each interconnected with a Zener diode to provide a different output control pulse in accordance with the polarity of the previously described voltage differential between points D and D'. Specifically, the first transistor circuit CA includes a control transistor T1 having a base 20, an emitter 21, and a collector 22 to control application of a supply voltage 23 to energize a control device 24, such as a relay, meter, or other control or indicator device. A switching transistor T2, having a base 25, an emitter 26 and a collector 27 is provided to control the action of control transistor T1. A Zener diode ZD responds to a predetermined voltage differential between points D and D' to control the switching action of transistor T2. More specifically, the voltage source 23 is coupled across control relay 24 through the emitter-to-collector current conduction path of transistor T1 for energizing relay 24 when transistor T1 is conducting. The emitter-to-base conducting path of transistor T1, when energized, causes transistor T1 to conduct, and may be traced from positive source 23, through emitter 21, base 20, emitter 26 and collector 27 of transistor T2, current limiting resistor 28, control relay 24 and back to the negative voltage of source 23. It is seen that transistor T2 must be in a conducting state to complete the emitter-to-base path of transistor T1, and for this purpose the base 25 is connected to point D' while the emitter 26 is connected through Zener diode ZD and blocking diode BD to point D. The Zener diode ZD and the blocking diode BD are connected in back-to-back relationship, with the Zener diode ZD disposed to oppose current flow from point D' through emitter 26 and base 25 to point D until a voltage differential between point D and D' has exceeded a predetermined value, and with the blocking diode BD disposed to oppose current flow from point D to point D', and to prevent the source 23 from energizing the transistor circuits CA and CA' when the voltage differential between the transformer-rectifier units is zero.

The second transistor circuit CA' is identical in structure and operation with that of the first transistor circuit CA so that corresponding parts thereof have been assigned the same reference numerals, with the addition of the suffix (′) to distinguish the elements of transistor circuit CA′. It is to be noted the transistor circuit CA′ is connected to the loop circuit at points D and D′ so as to respond to a voltage differential having a polarity opposite to that which operates transistor circuit CA. Specifically, the Zener diode ZD′ connects the emitter 26′ of transistor T2′ to point D′ while the base 25′ is connected to potential point D so that transistor T2′ is driven to conduction only in response to a predetermined positive potential at point D′ relative to point D.

In the normal operation of the voltage unbalance detecting apparatus, the line-to-line voltages between phases A—B and B—C will be equal to the line-to-line voltage between phases A′—B′ and B′—C′ so that a small circulating current is provided around loop circuit L, and a zero potential thus exists between points D and D′. This lack of potential provides a non-conducting condition for the emitter-to-base path of each of transistors T2 and T2′ so that the emitter-to-collector path of each transistor T2 and T2′ is maintained in a non-conducting condition in well-known manner. The non-conducting condition of each of transistors T2 and T2′ prevents completion of the emitter-to-base path of each of transistors T1 and T1′, respectively, so that in a similar manner, the emitter-to-collector path of each of transistors T1 and T1′ are maintained in a non-conducting condition to thus prevent source 23 from energizing either of control devices 24 or 24′.

If an abnormal condition should occur to place one or more of phases A, B or C in an open condition, the voltage output from transformer-rectifier unit TR will be less than that of transformer-rectifier unit TR′ thus providing potential point D′ with a positive voltage relative to point D, which particular polarity causes circuit CA′ to operate control relay 24′, but has no effect upon transistor circuit CA. Specifically, when the positive potential at point D′ exceeds a predetermined breakdown voltage of Zener diode ZD′, it conducts to permit current flow from potential point D′ through the emitter-to-base circuit of transistor T2′ to point D, thus biasing transistor T2′ to a conducting condition through its emitter-to-collector path. The conducting condition of transistor T2′ completes the emitter-to-base path in transistor T1′, thus permitting source 23 to bias transistor T1′ to a conducting condition through its emitter-to-collector path to energize control device 24′. When the abnormal condition is corrected, the apparatus returns to the normal condition.

Meanwhile, in the transistor circuit CA, the blocking diode BD and the base-emitter diode of transistor T2 prevent current flow from point D′ through transistor T2 to point D, thus maintaining the control relay 24 in the deenergized condition as previously described.

If an open condition should occur in one or more of the phases A′, B′, or C′, the voltage output from transformer-rectifier unit TR′ will now be less than that from transformer-rectifier unit TR to provide a potential difference between points D and D′ having a polarity opposite to that previously described so that point D will now be positive relative to point D′. In transistor circuit CA, the Zener diode ZD breaks down to initiate a conducting action in both transistors T2 and T1 to permit energization of control relay 24, while in transistor circuit CA′ the blocking diode BD′ and the base-emitter diode of transistor T2′ prevent current flow from point D through transistor T2′, thus maintaining the control device 24′ in this normally deenergized condition as previously described.

It is apparent that the sensitivity of the voltage unbalance detector may be increased by omitting the Zener diodes ZD and ZD′, if desired.

In one application of the invention, a voltage differential may be detected between a first feeder supplying a regulator, and a second feeder supplying an overcurrent-undervoltage relay device for tripping a generator breaker, so that the voltage differential may sound an alarm and/or block operation of the regulator where the voltage unbalance is such as may be caused by the operation of a fuse in the primary of the transformer supplying the regulator feeder, and alternatively, the voltage differential may sound an alarm and/or prevent operation of the relay device if the voltage unbalance is such as may be caused by operation of a fuse in the primary of the transformer supplying the second feeder to the overcurrent-undervoltage device. In the drawing figure, phase A, B, and C would comprise the first feeder, phases A′, B′, and C′ would comprise the second feeder, relay 24′ would be connected to block operation of the regulator and sound an alarm and relay 24 would be connected to prevent operation of the overcurrent-undervoltage relay and sound the same alarm or, if desired, sound a different alarm.

The drawing and the foregoing description have individually and collectively disclosed a voltage unbalance detecting device comprised of static elements cooperating to provide quick detection of an unbalanced condition between two voltages to determine which voltage is relatively low, and to provide quick switching action for producing an appropriate control signal in accordance with the voltage difference determination.

The invention is not intended to be restricted to the specific structural details as shown in the drawing and described in the specification, as various modifications thereof may be effected without departing from the spirit and scope of the invention.

I claim as my invention:

1. In a voltage unbalance detector: loop circuit means for connecting a pair of voltage sources in series additive circuit relationship; current limiting resistance means in said loop circuit; a first pair of transistors of one type each having an emitter, a collector and a base; conductor means connecting the base of one transistor and the emitter of the other transistor to a common potential point on one side of said loop at the mid point of said resistance means; means connecting the emitter of said one transistor and the base of the other transistor to a common potential point on the other side of said loop; each emitter of said first pair of transistors being connected to its respective potential point through a blocking diode having a polarity opposing current flow to its respective potential point; a second pair of transistors of a type similar to said first pair of transistors, each corresponding to one of said first pair of transistors, and each having an emitter, a collector and a base; conductor means connecting the collectors of the corresponding transistors; conductor means connecting the base of each second transistor to the emitter of the corresponding one of the first pair of transistors; a source of direct current; conductor means connecting said emitters of said second pair of transistors to one side of said direct current source; a pair of control devices, each corresponding to a different one of said second pair of transistors, each having one side connected to the collector of the corresponding transistor of said second pair and having the other side connected to the other side of said direct current source.

2. In a voltage unbalance detector: loop circuit means for connecting a pair of voltage sources in series additive circuit relationship; current limiting resistance means in said loop circuit; a first pair of transistors of one type each having an emitter, a collector and a base; conductor means connecting the base of one transistor to a first potential point on one side of said loop at the mid point of said resistance means; a Zener diode and a blocking diode in opposed polarity relationship connecting the emitter of the other transistor to said potential point with the blocking diode having a polarity opposing current flow to said potential point; means connecting the base of the other transistor to another potential point on the other side of said loop; a Zener diode and a blocking diode in opposed polarity relationship connecting the emitter of the one transistor to said another potential point with the blocking diode having a polarity opposing current flow to said another potential point; a second pair of transistors of a type similar to said first pair of transistors, each corresponding to one of said first pair of transistors, and each having an emitter, a collector and a base; conductor means connecting the collectors of the corresponding transistors; conductor means connecting the base of each second transistor to the emitter of the corresponding one of the first pair of transistors; a source of direct current; conductor means connecting said emitters of said second pair of transistors to one side of said direct current source; a pair of indicating means, each corresponding to a different one of said second pair of transistors, each having one side connected to the collector of the corresponding transistor of said second pair and having the other side connected to the other side of said direct current source.

References Cited in the file of this patent

UNITED STATES PATENTS

| | | |
|---|---|---|
| 2,454,807 | Kennedy | Nov. 30, 1948 |
| 2,603,689 | Stevens | July 15, 1952 |
| 2,840,723 | Brown | June 24, 1958 |
| 2,859,357 | Schmeling | Nov. 4, 1958 |